United States Patent Office 3,287,383
Patented Nov. 22, 1966

3,287,383
PRODUCTION OF HYDROXY ESTERS BY CATALYTIC HYDROGENATION OF ALDEHYDIC PEROXIDES
Robert H. Perry, Jr., Springfield, N.J., assignor, by mesne assignments, to Esso Research and Engineering Company, Elizabeth, N.J., a corporation of Delaware
No Drawing. Filed July 12, 1965, Ser. No. 471,446
15 Claims. (Cl. 260—410.9)

This application is a continuation-in-part of Serial No. 160,274, filed December 18, 1961, now abandoned.

The present invention relates to the preparation of esters from olefins. More particularly, the present invention deals with the preparation of esters from cyclic olefins by ozonolysis of the olefins to an intermediate alkoxy peroxide derivative which is transformed by a hydrogenation-rearrangement into the ester. In a related aspect, the invention deals with the production of hydroxy esters by the same method. The present invention also deals with the formation of a novel diol and half ester by the practice of the combination ozonolysis-hydrogenation. In its most particular aspects, the present invention deals with the monoozonolysis of cyclic mono- and polyenes in a reactive solvent, followed by the reduction and rearrangement of the peroxidic intermediate by catalytic hydrogenation or chemical reduction thereof, to produce the final product.

Hydroxy esters are important intermediates in organic syntheses, and the ω-hydroxy esters are particularly suited for the preparation of polyesters which may be employed in plastics, fibers, synthetic rubber, adhesives, etc. Hydroxy esters in which $n=5$ or more are generally useful for polymer syntheses:

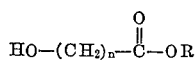

where R=alkyl (generally primary) containing 1 to 10 carbon atoms.

Monomers which possess olefinic unsaturation (in addition to the bifunctionality required for polymerization) provide sites through which subsequent reactions of the initially formed polymer may be accomplished. These reactions, such as crosslinking, conversion to other functional groups, etc., can be carried out to give modified properties of the basic polymer structure.

The present invention in one aspect provides a method for the preparation of ω-hydroxy esters in which the starting materials are cyclic olefins, etc. ω-Hydroxy acids or esters have in the past been prepared in various ways, normally from other ω-functional acids or from lactones. One preparative route to lactones or polyesters suitable for polymerization involves starting with a cyclic ketone having five or more carbon atoms and treating with peroxy acids, i.e., the Baeyer-Villiger reaction. Some other methods that have been employed involve hydrolysis of ω-halo compounds. Moderately long-chain ω-functional derivatives from which ω-hydroxy esters or acids can be synthesized are not, in general, readily obtained from simple raw materials and often require rather involved, multi-step synthetic routes for their preparation.

The process of the present invention is such that the starting materials are cyclic olefins, of which a number are readily available, and conversion to esters, hydroxy esters, or other multifunctional derivatives requires no more than two conversion steps. This is illustrated in the following simplified diagram:

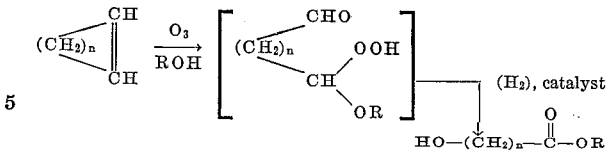

where
$n=3$ to 20,
R=alkyl group containing 1 to 10 carbon atoms.

As is seen above, the olefinic linkage is attacked by ozonolysis to form a complex hydroperoxidic intermediate which in its simplest designation exhibits an aldehydic group at one of the open ends and an alkoxy hydroperoxidic group at the other end of the chain. Concurrently, the aldehydic functional group is reduced to the hydroxy function while the alkoxy hydroperoxidic group is converted to a carboalkoxy group. Thus, the hydroxy group is provided in the acid moiety of the resultant hydroxy ester. It should be noted that in the initial ozonolysis step the solvent to be used is characterized by reacting with the olefin and the ozone to form the alkoxy hydroperoxidic grouping at the point of cleavage of the double bond. Suitable reactive solvents for this use are found in the alcohols, such as methanol, ethanal, normal propanol, isopropanol, butanol, isobutanol, propanol, hexanol, heptanol, octanol, nonanol, decanol, etc.

Generally, all cyclic olefins will provide suitable feed stocks for the present invention. Typical olefin starting materials are cyclopentene, cyclohexene, cycloheptene, cyclooctene, cyclononene, cyclodecene, cyclododecene, etc., 1,4-cyclohexadiene, 1,4-cycloheptadiene, 1,4- and 1,5-cyclooctadiene, 1,5,9-cyclododecatriene, norbornylene norbornadiene, dicyclopentadiene, 4-vinylcyclohexane, and others. Cyclic polyolefins such as cyclododecatriene are utilized to produce unsaturated hydroxy esters such as diethyl-4,8-dodecadiene-1,12-dioate, while cyclic olefins such as cyclohexene will produce the saturated hydroxy esters. Whereas hydroxy esters are frequently recovered in the monomeric form, intermolecular condensation may take place (particularly in the case of the higher molecular weight hydroxy esters) and the products are isolated in polymeric form.

It should be stressed that ozonolysis while utilizing a reactive alcohol solvent produces an alkoxy hydroperoxidic intermediate rather than the ozonide which would be obtained from the utilization of a nonreactive solvent.

The ozonolysis step, in the reactive solvent medium, is normally accomplished at a low temperature. This temperature may range from about —78° C. to about +20° C. Pressures utilized may range from subatmospheric pressures at about 5 p.s.i.a. to superatmospheric pressures up to about 20 p.s.i.a.. The ozonolysis reaction preferably is carried out at about atmospheric pressure. The ozonolysis gas suitably is produced by using a commercial ozone generator in which an air or oxygen stream is passed through the generator to form an ozone-containing gas of about 3% to about 10% ozone. In the case of cyclic monoolefins, one molar equivalent of ozone is employed in the ozonolysis step. In the process of the invention using cyclic polyolefins, it is desirable to limit the attack of ozone to essentially one double bond in the molecule. This is accomplished in the absence of rate-influencing structural factors (such as conjugated unsaturated groups and other substituent groups on the double bond; i.e., when only isolated C=C bonds are present) by employing low conversions (e.g., 20%) in the ozonolysis step. Where rate-influencing structural factors are present, it is sometimes possible to employ higher conversion and yet maintain high selectivity to monoozonolysis. The level of conversion is controlled by measuring the ozone in the tail gas and in the ozonizing gas. The difference indicates the amount reacted, and the ozonolysis is terminated when the desired amount of ozone has been reacted; e.g., 0.2 mol ozone per mol of olefin. Therefore, monoozonolysis may be accomplished as the first step of the present invention.

The olefin concentration in the reactive solvent during ozonolysis is within the range from about 5 mol percent to about 25 mol percent. The peroxidic intermediate product resulting from the ozonolysis step may be recovered and purified by distilling the solvent and unreacted olefin from the reaction zone, followed by extraction with a polar solvent; e.g., by washing the residue with a solvent mixture, such as petroleum ether-methanol, alcohol-water solution, etc. However, the intermediate may be and preferably is further treated while remaining in solution in the ozonolysis reactive solvent.

The reduction-rearrangement reaction may be accomplished either catalytically or noncatalytically. The catalyst to be used may be a metal, such as nickel, platinum, or other similar hydrogenation catalysts, or a chemical reducing agent as aluminum alkoxide in a secondary alcohol may be used. In the catalytic reduction, the concentration of the intermediate product in the liquid phase is not critical, and the amount of catalyst, when utilized, likewise is not critical, being effective in concentrations as low as 100 p.p.m. by weight as well as up to a concentration of 10 weight percent in the liquid phase, based upon the olefin present. Hydrogen is contacted with the intermediate in at least stoichiometric amounts, a slight excess being preferred. A broad range of temperatures may be used above about 75° C. (preferably from 75° C. to 150° C.), at pressures above 390 p.s.i.g. (preferably from 390 to 2500 p.s.i.g.). At lower temperatures, the hydroxy ester product of the present invention is not obtained. As will be seen by reference to Examples 3 and 5, attempts to reduce the ozonolysis product at 25° C. and 45° C. were ineffective in producing the hydroxy ester, although an aldehyde product could be obtained. The reaction time is preferably about 3 hours but is not critical so long as sufficient time is allotted for the reaction to take place.

The chemical reduction is accomplished by using the chemical agent at least in a stoichiometric amount, but preferably in slight excess. During chemical reduction of the carbonyl function, the reducing agent appears to promote the elimination of water from the alkoxy hydroperoxidic function to produce an ester linkage at that point.

During the chemical reduction of the hydroperoxide intermediate, where aluminum isopropoxide has been used, new compositions of matter have been produced. These compositions are ethyl hydrogen-4,8-dodecadienedioate and 4,8-dodecadiene-1,12-diol. The preparation of these materials as well as that of hydroxy esters is described in the following examples.

*Example 1*

Cyclohexene (21 g.) dissolved in 150 ml. of ethanol was treated with ozone at atmospheric pressure and −78° C. until one molar equivalent of ozone had reacted with the cyclohexene. The ozone source was a gaseous stream containing 4 percent ozone in oxygen. The completion of the ozonolysis was indicated by analysis of the tail gas from the reaction zone, and the reaction was terminated when analysis of this tail gas indicated that no further ozone was being absorbed. At this point, 3 g. of platinum-on-charcoal (10%) was added to the reaction liquid in a rocker-type autoclave, and the temperature was raised to 150° C. while the pressure was raised to 1500 p.s.i.g. with hydrogen. Hydrogenation was continued for about 3 hours.

The products of this hydrogenation reaction were separated by distillation, and 38 weight percent of the product was shown to be ethyl-ε-hydroxy caproate having a boiling point of 75° C. to 76° C. at 3 mm. Hg pressure. This represented 27% of the theoretical yield. The product of this reaction was identical in infrared and nuclear magnetic resonance spectra with these properties as exhibited by an authenic sample of ethyl-ε-hydroxy caproate prepared by permonosulfuric acid oxidation of cyclohexanone.

Other products identifiable were: hexamethylene glycol (23 wt. percent); n-hexyl alcohol (15 wt. percent); unidentified lower boiling alcohols and esters (8 wt. percent); and oil (about 10 wt. percent) having a boiling point of 135° C. to 140° C. at 0.18 mm. Hg pressure, which is believed to be the dimeric ester

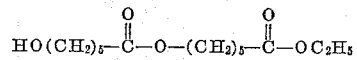

and a nonvolatile residue (6 wt. percent), which appeared to be a polymeric form of the caproic ester.

Attempted distillation of the dimeric ester at higher pressure resulted in the formation of ε-caprolactone and ethanol.

*Example 2*

The ozonolysis product of cyclohexene was prepared as in Example 4, and the hydrogenation reaction carried out under generally similar conditions using Raney nickel (5 g.) as the hydrogenation catalyst. Upon distillation of the final product, ethyl-ε-hydroxy caproate was separated. There was a tendency during the latter stages of the distillation to polymerize to a rubbery mass, which could be saponified and presumably was a polyester formed by thermal condensation of the lower hydroxy esters.

*Example 3*

The product of ozonolysis of cyclohexene in methanol solution was treated with hydrogen in the presence of platinum-on-charcoal catalyst and trace quantities of aqueous ferrous sulfate solution at room temperature (about 25° C.) and atmospheric pressure. Peroxidic function was destroyed slowly under these conditions with concomitant formation of free aldehyde. Some hydrogen uptake occurred in the system following apparent loss of peroxidic activity, although aldehyde was not reduced very rapidly, and the atmospheric run was discontinued. No hydroxy ester was detected. The total product was then transferred to an autoclave and hydrogenated at about 75° C. maximum and 390 p.s.i.g. Under these conditions, some methyl-ε-hydroxy caproate was found together with other esters and an appreciable amount of unreacted aldehyde, but because of the sampling at the lower pressure, no quantitative yield data are available.

*Example 4*

Product from the ozonolysis of cyclohexene in ethanol was mixed with a small quantity of aqueous ferrous sulfate solution and platinum-on-charcoal catalyst, resulting in instantaneous oxidation of ferrous to ferric ion. The mixture was placed in an autoclave and treated with hydrogen at about 300 p.s.i.g. and room temperature (ca. 25° C.) for about 24 hours. During the initial pressurization step a vigorous exothermicity was observed, aparently due to decomposition of the ozonide (peroxide) present. At the end of the 24-hour period, the product still contained appreciable aldehydic products, and no hydroxy ester was detected.

*Example 5*

The product of ozonolysis of cyclohexene in ethanol was treated with platinum-on-charcoal catalyst in the absence of ferrous ion at about 45° C. and 750 p.s.i.g. Peroxidic function was rapidly destroyed. Appreciable aldehyde existed at the end of the run period (ca. 20 hours), but hydroxy ester was not evident.

Example 6

*Monoozonolysis of cyclododecatriene.*—An intermediate hydroperoxide was formed by ozonizing 41 g. (0.254 mol) of cyclododecatriene in 140 ml. of a 50–50 mixture of ethanol and dichloromethane. The admixture was contacted with a gas containing 54 mg. of ozone per liter of gas at a rate of 1 liter per minute and at a temperature of −78° C. The pressure in the ozonolysis reactor was atmospheric. Reaction was stopped after the addition of 0.051 mol of ozone which represented 20% conversion of the cyclododecatriene. The solvent was evaporated under reduced pressure. Petroleum ether (100 ml.) was added to the nonvolatile oil which remained after evaporation of the solvent, and the resulting solution was extracted once with pure methanol and subsequently with four portions of 35 ml. each of a 9:1 methanol-water solution. The extract was partially evaporated to concentrate the solution, leaving 15.1 gm. of nonvolatile oil.

Example 7

The oil resulting from the monoozonolysis of cyclododecatriene as set forth in Example 6 was dissolved in 150 ml. of ethanol, 1 g. of Raney nickel catalyst added and the mixture heated to 150° C. with hydrogen (1800 p.s.i.g.) for 8 hours and cooled to room temperature (30° C.) over the following 6 hours. The product was filtered and evaporated to a nonvolatile mixture under reduced pressure to give 11.9 g. of white semisolid mass. Petroleum ether was added and the mixture crystallized on cooling. The solid was recovered by filtration to produce 4.1 g. of crude dodecane-1,12-diol, having a melting point of 73° C. to 77° C. After two crystallizations in cold ethanol, 4.0 g. of purified product was obtained having a melting point of 78° C. to 80° C. as compared to the literature value of 79.5°. Distillation of the initial filtrate was attempted at 1 mm. of mercury pressure, giving as the only volatile product approximately 0.5 g. of cyclododecane. The bottoms material was recovered as a viscous liquid and consisted largely of mono- and polymeric ethyl hydroxy dodecanoic ester.

Example 8

1,5,9-cyclododecatriene (162 g., 1.0 mol) was ozonized with 52 mg./1 ozone at −60° in a solution of 170 ml. of ethanol and 170 ml. of dichloromethane until 18.5% conversion (based on ozone absorbed) had been reached. The solvent was evaporated and 100 ml. of petroleum ether added. The solution was extracted with five 50 ml. portions of 90/10 methanol-water solution and the resulting extract evaporated to an oil, 63.7 g. Isopropyl alcohol (600 ml.) and 41.6 g. (0.24 mol) of aluminum isopropoxide were added and the solution distilled until acetone appearing in the distillate had become negligible. The slurry was treated with 800 ml. of 30% sulfuric acid and extracted with five 100 ml. portions of ether, and the extracts were dried over sodium sulfate and distilled. Distillate was obtained, boiling without a plateau, at 118–215°/0.3–0.75 mm., and oil in the still pot suddenly polymerized almost instantaneously to a yellow, rubbery mass (7.9 g.). The middle cuts in the above fraction were found to be acidic (neutral equivalent: 338) and were separated into a neutral (5 g.) and acidic fraction (10.2 g.) by neutralization with aqueous base, extraction of neutral material with ether, reacidification and ether extraction. The acid portion was partially rectified by redistillation at 156–158°/0.8 mm., but it tended to decompose, forming nonvolatile residue during distillation [neutral equivalent (NE): 497; NE of dimer 463, calculated].

*Analysis.*—Calculated for $C_{14}H_{22}O_4$: C, 66.11; H, 8.72. Found: C, 66.60; H, 9.16.

The distillate exhibited nuclear magnetic resonance (NMR) spectra and properties entirely consistent with those expected of ethyl hydrogen-4,8-dodecadiene-1,12-dioate. The half ester was esterified with ethanol and methane sulfonic acid to give pure diethyl-4,8-dodecadiene-1,12-dioate, B.P. 119°/0.15 mm., which was characterized by analysis and spectra. NMR analysis for relative hydrogen types was in firm agreement with the calculated values.

*Analysis.*—Calculated for $C_{16}H_{26}O_4$: C, 68.05; H, 9.28. Found: C, 68.22; H, 9.49.

The neutral portion (above) possessed strong infrared bands characteristic of hydroxy (2.9μ), carbonyl (5.8μ),

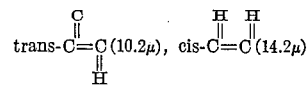

and C—O—C (broad, 8.5μ) functions. This material was redistilled and 2 g. of product boiling at 114–120°/0.02 mm. was isolated which was found to be 4,8-dodecadiene-1,12-diol. This substance consumed two molar equivalents of hydrogen to give 1,12-dodecanediol (M.P. 75–78°). The remainder of the neutral fraction consisted of partially saponifiable esters possessing hydroxyl function. Analysis indicated this material to be largely dimeric and higher condensed esters of ethyl hydroxydodecadienoate.

As has been set forth in the foregoing specification, the inventor has provided a method of forming hydroxy esters by monoozonolysis of an olefin in a reactive solvent, followed by a mild reduction, catalytic or chemical. The inventor having set forth the essence of the invention and in a preferred manner and best mode of practicing it, Letters Patent are solicited in terms limited not by the specific examples, but only by the appended claims.

I claim:
1. A method of preparing a hydroxy ester having the hydroxy group in the acid moiety which comprises
   contacting an aldehydic peroxide, formed by monoozonolysis of a cyclic olefin having from 5 to 22 ring carbon atoms in a $C_1$ to $C_{10}$ alkanol,
   with hydrogen and a hydrogenation catalyst,
   under hydrogenation conditions including a temperature of 75° C. to 150° C. and a pressure of 390 to 2500 p.s.i.g., for a time period sufficient to allow the desired reaction to take place.

2. A method in accordance with claim 1 wherein pressure is from 1500 to 2000 p.s.i.g.

3. A method in accordance with claim 1 wherein the hydrogenation catalyst comprises platinum.

4. A method in accordance with claim 1 wherein the hydrogenation catalyst comprises Raney nickel.

5. A method in accordance with claim 1 wherein the cyclic olefin is 1,5,9-cyclododecatriene, the alkanol is ethanol, the catalyst comprises Raney nickel, the temperature is about 150° C., and the pressure is about 1800 p.s.i.g.

6. A method in accordance with claim 1 wherein the cyclic olefin is 1,5,9-cyclododecatriene, the alkanol is ethanol, the catalyst comprises Raney nickel, the temperature is about 150° C., the pressure is about 1800 p.s.i.g., and the reaction time for hydrogenation is about 3 hours.

7. A method in accordance with claim 1 wherein the cyclic olefin is cyclohexene, the alkanol is ethanol, the catalyst comprises Raney nickel, the temperature is about 150° C., and the pressure is about 1500 p.s.i.g.

8. A method in accordance with claim 1 wherein the cyclic olefin is cyclohexene, the alkanol is ethanol, the catalyst comprises Raney nickel, the temperature is about 150° C., the pressure is about 1500 p.s.i.g., and the reaction time for hydrogenation is about 3 hours.

9. A method of preparing a hydroxy ester having the hydroxy group in the acid moiety which comprises
   contacting a cyclic olefin having from 5 to 22 carbon atoms in the ring with an ozone-containing gas in the presence of a $C_1$ to $C_{10}$ alkanol, under ozonolysis conditions including a temperature of $-78°$ C. to $+20°$ C., to produce an aldehydic peroxide intermediate product having only one olefinic linkage ozonized, and contacting said intermediate product with hydrogen and a hydrogenation catalyst under hydrogenation conditions including a temperature of 75° C. to 150° C. and a pressure of 390 to 2500 p.s.i.g., for a reaction time sufficient to accomplish the desired reaction whereby a hydroxy ester is produced having the hydroxy group in the acid moiety.

10. A method in accordance with claim 9 wherein the cyclic olefin is 1,5,9-cyclododecatriene, the alkanol is ethanol, the catalyst comprises Raney nickel, the temperature is about 150° C., the pressure is about 1800 p.s.i.g., and the reaction time is about 3 hours.

11. A method in accordance with claim 9 wherein the cyclic olefin is cyclohexene, the alkanol is ethanol, the catalyst comprises platinum on charcoal, the reaction temperature is about 150° C., the pressure is about 1500 p.s.i.g., and the reaction time is about 3 hours.

12. A method in accordance with claim 9 wherein the cyclic olefin is cyclohexene, the alkanol is ethanol, the catalyst comprises Raney nickel, the temperature is 150° C., the pressure is 1500 p.s.i.g., and the reaction time is about 3 hours.

13. A method of preparing a hydroxy ester having the hydroxy group in the acid moiety which comprises contacting a cyclic olefin having from 5 to 22 carbon atoms in the ring with an ozone-containing gas in the presence of a $C_1$ to $C_{10}$ alkanol, under ozonolysis conditions including a temperature of $-78°$ C. to $+20°$ C., to produce an aldehydic peroxide intermediate product having only one olefinic linkage ozonized, and contacting said intermediate product with a stoichiometric excess of aluminum isopropoxide, based upon the aldehydic linkages in said intermediate, whereby a hydroxy ester is produced having the hydroxy group in the acid moiety.

14. A method in accordance with claim 13 wherein the cyclic olefin is 1,5,9-cyclododecatriene and the alkanol is ethanol, and further comprising utilizing dichloromethane in equal volumes with said ethanol as a reaction solvent.

15. A method of preparing ethyl-ε-hydroxy caproate which comprises admixing cyclohexene and ethanol in a mol ratio of about from 1:20 to about 1:4 and contacting the resulting admixture with an ozone-containing gas under ozonolysis conditions including a temperature of $-78°$ C. to $+20°$ C., to produce an aldehydic peroxide intermediate product, and contacting said intermediate product with hydrogen and a platinum hydrogenation catalyst under hydrogenation conditions including a temperature of $+75°$ C. to $+150°$ C. and a pressure of 390 to 2500 p.s.i.g.

References Cited by the Examiner

UNITED STATES PATENTS

| | | | |
|---|---|---|---|
| 2,680,713 | 6/1954 | Lindsey et al. | 260—485 |
| 2,733,270 | 1/1956 | Fisher | 260—500 |
| 2,811,551 | 10/1957 | Coffman et al. | 260—485 |
| 3,059,028 | 9/1962 | Perry | 260—533 |
| 3,219,675 | 11/1965 | Seekircher | 260—406 X |

OTHER REFERENCES

Fisher et al.: "Berichte," vol. 65 (1932), pp. 1467–1472.

Perry: "J. Org. Chem.," vol. 24 (1959), p. 829–833.

Fieser: "Organic Chemistry," third ed., 1956, pp. 64–66 and 207.

LORRAINE A. WEINBERGER, *Primary Examiner.*

A. P. HALLUIN, *Assistant Examiner.*